US012046781B2

(12) United States Patent
Sakai et al.

(10) Patent No.: US 12,046,781 B2
(45) Date of Patent: Jul. 23, 2024

(54) COMPRESSION APPARATUS

(71) Applicant: Panasonic Intellectual Property Management Co., Ltd., Osaka (JP)

(72) Inventors: Osamu Sakai, Osaka (JP); Yukimune Kani, Osaka (JP); Takashi Kakuwa, Osaka (JP); Hiromi Kita, Nara (JP); Tomoya Kamata, Osaka (JP); Takayuki Nakaue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 581 days.

(21) Appl. No.: 17/464,579

(22) Filed: Sep. 1, 2021

(65) Prior Publication Data

US 2021/0399319 A1 Dec. 23, 2021

Related U.S. Application Data

(63) Continuation of application No. PCT/JP2021/005401, filed on Feb. 15, 2021.

(30) Foreign Application Priority Data

Apr. 20, 2020 (JP) .................................. 2020-074686

(51) Int. Cl.
*H01M 8/04276* (2016.01)
*H01M 8/04029* (2016.01)

(52) U.S. Cl.
CPC ... *H01M 8/04276* (2013.01); *H01M 8/04029* (2013.01)

(58) Field of Classification Search
CPC ......... H01M 8/04276; H01M 8/04029; H01M 8/248; H01M 8/242; H01M 8/04074;
(Continued)

(56) References Cited

U.S. PATENT DOCUMENTS 6,489,049 B1 * 12/2002 Johnson .................. H01M 8/20
429/446
2007/0246363 A1 * 10/2007 Eisman ................ B01D 53/326
204/252
(Continued)

FOREIGN PATENT DOCUMENTS

| JP | 2015-117139 | 6/2015 |
| JP | 2017-210660 | 11/2017 |
| JP | 2019-163521 | 9/2019 |

OTHER PUBLICATIONS

International Search Report of PCT application No. PCT/JP2021/005401 dated Apr. 13, 2021.

*Primary Examiner* — Muhammad S Siddiquee
(74) *Attorney, Agent, or Firm* — Rimon P.C.

(57) ABSTRACT

A compression apparatus includes a stack of electrochemical cells each including an anode, a cathode, and an electrolyte membrane interposed therebetween, a pair of insulating plates disposed at respective ends of the stack in a stacking direction, a pair of first end plates disposed on outside surfaces of the respective insulating plates, and a voltage applicator that applies a voltage between the anode and the cathode. Upon the voltage applicator applying the voltage, the compression apparatus causes hydrogen included in a hydrogen-containing gas fed to the anode to move to the cathode and produces compressed hydrogen. One of the first end plates have a first channel formed therein, through which the hydrogen-containing gas fed to the anode flows, and a second channel formed therein, through which a heating medium flows. The compression apparatus further includes a heater that heats the heating medium.

4 Claims, 4 Drawing Sheets

(58) Field of Classification Search
CPC ........... Y02E 60/50; Y02E 60/36; C01B 3/56;
C25B 1/02; C25B 9/00; C25B 9/67;
C25B 9/70; C25B 15/021; C25B 9/75;
C25B 9/77
See application file for complete search history.

(56) References Cited

U.S. PATENT DOCUMENTS

| | | | |
|---|---|---|---|
| 2018/0155193 A1* | 6/2018 | Sakai | H01M 8/0681 |
| 2018/0166713 A1* | 6/2018 | Wakita | C25B 1/02 |
| 2018/0179647 A1* | 6/2018 | Ukai | C25B 1/04 |
| 2019/0383283 A1* | 12/2019 | Ukai | B01D 53/326 |
| 2020/0011313 A1* | 1/2020 | Ukai | H01M 8/248 |

* cited by examiner

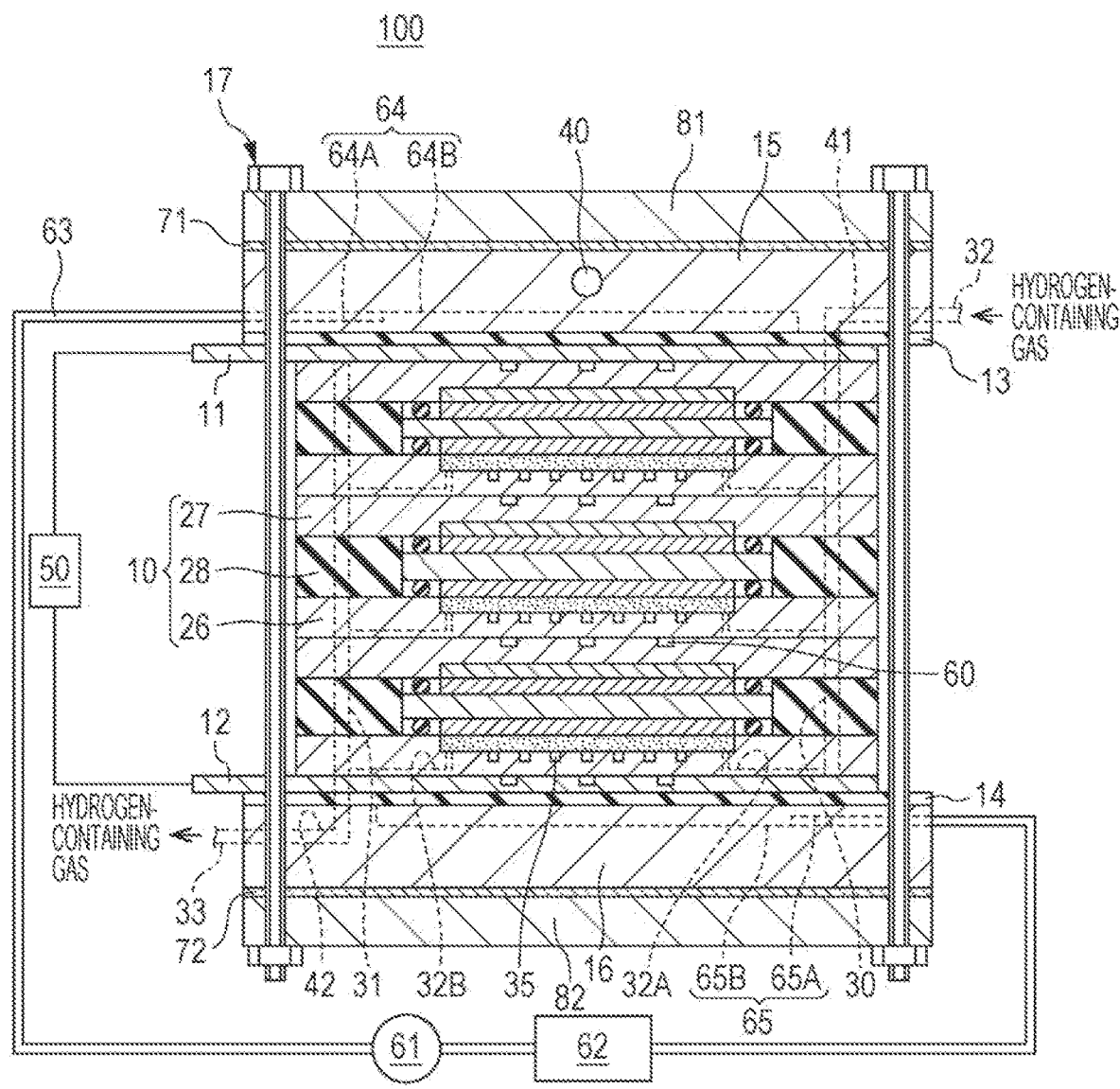

COMPRESSION APPARATUS

BACKGROUND

1. Technical Field

The present disclosure relates to a compression apparatus.

2. Description of the Related Art

Because of environmental issues, such as global warming, and energy problems, such as exhaustion of petroleum resources, great attention has been focused on hydrogen as a clean alternative energy resource to fossil fuel. High expectations have been placed on hydrogen as clean energy, since hydrogen basically produces only water, does not produce carbon dioxide, which contributes to global warming, and substantially does not produce nitrogen oxides when combusted. Examples of apparatuses that use hydrogen as a fuel at high efficiencies include fuel cells, which have been developed and become popular for use in automobile power sources and household self-power generation.

For example, hydrogen used as a fuel for fuel cell vehicles is commonly stored in a hydrogen tank included in the vehicle at high pressures, that is, while compressed to several tens of megapascal. The high-pressure hydrogen is commonly produced by compressing low-pressure (normal pressure) hydrogen with a mechanical compression apparatus.

In the coming hydrogen society, there is a demand for the development of the technology for storing the hydrogen at high densities in order to transport or use the hydrogen at small volume and low costs, as well as the technology for producing hydrogen. In particular, it is necessary to upgrade hydrogen feed infrastructures for accelerating the popularization of fuel cells. There have been proposed various methods in which high-purity hydrogen is produced, purified, and stored at high densities in order to feed hydrogen consistently.

For example, Japanese Unexamined Patent Application Publication No. 2015-117139 proposes an electrochemical hydrogen pump that purifies and pressurizes hydrogen included in a hydrogen-containing gas by applying a predetermined voltage between an anode and a cathode that are provided with an electrolyte membrane interposed therebetween. Hereinafter, a multilayer body constituted by a cathode, an electrolyte membrane, and an anode is referred to as "membrane electrode assembly (MEA)". The hydrogen-containing gas fed to the anode may contain impurities. For example, the hydrogen-containing gas may be a hydrogen gas discharged from an iron-making factory or the like as a by-product or a reformed gas produced by reforming town gas.

For example, Japanese Patent No. 6382886 proposes a differential pressure water electrolyzer that produces low-pressure hydrogen by electrolysis of water and pressurizes the low-pressure hydrogen using MEAs.

For example, Japanese Unexamined Patent Application Publication No. 2019-163521 proposes an electrochemical hydrogen pump that may have a high hydrogen compression efficiency since at least a part of an anode catalyst layer is a mixed layer of the anode catalyst layer and an anode gas diffusion layer.

SUMMARY

One non-limiting and exemplary embodiment provides a compression apparatus that may suppress a reduction in the efficiency of hydrogen compression action, compared with the compression apparatuses known in the related art.

In one general aspect, the techniques disclosed here feature a compression apparatus including a stack including a plurality of electrochemical cells stacked on top of one another, the electrochemical cells each including an anode, a cathode, and an electrolyte membrane interposed between the anode and the cathode; a pair of insulating plates disposed at respective ends of the stack in a direction in which the electrochemical cells are stacked; a pair of first end plates disposed on outside surfaces of the respective insulating plates; and a voltage applicator that applies a voltage between the anode and the cathode. Upon the voltage applicator applying the voltage, the compression apparatus causes hydrogen included in a hydrogen-containing gas fed to the anode to move to the cathode and produces compressed hydrogen. One of the first end plates have a first channel through which the hydrogen-containing gas fed to the anode flows and a second channel through which a heating medium flows, the first and second channels being formed in one of the first end plates. The compression apparatus further includes a heater that heats the heating medium.

The compression apparatus according to the above aspect of the present disclosure may suppress a reduction in the efficiency of hydrogen compression action, compared with the compression apparatuses known in the related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of an electrochemical hydrogen pump according to a third embodiment.

DETAILED DESCRIPTION

Figure 1A:
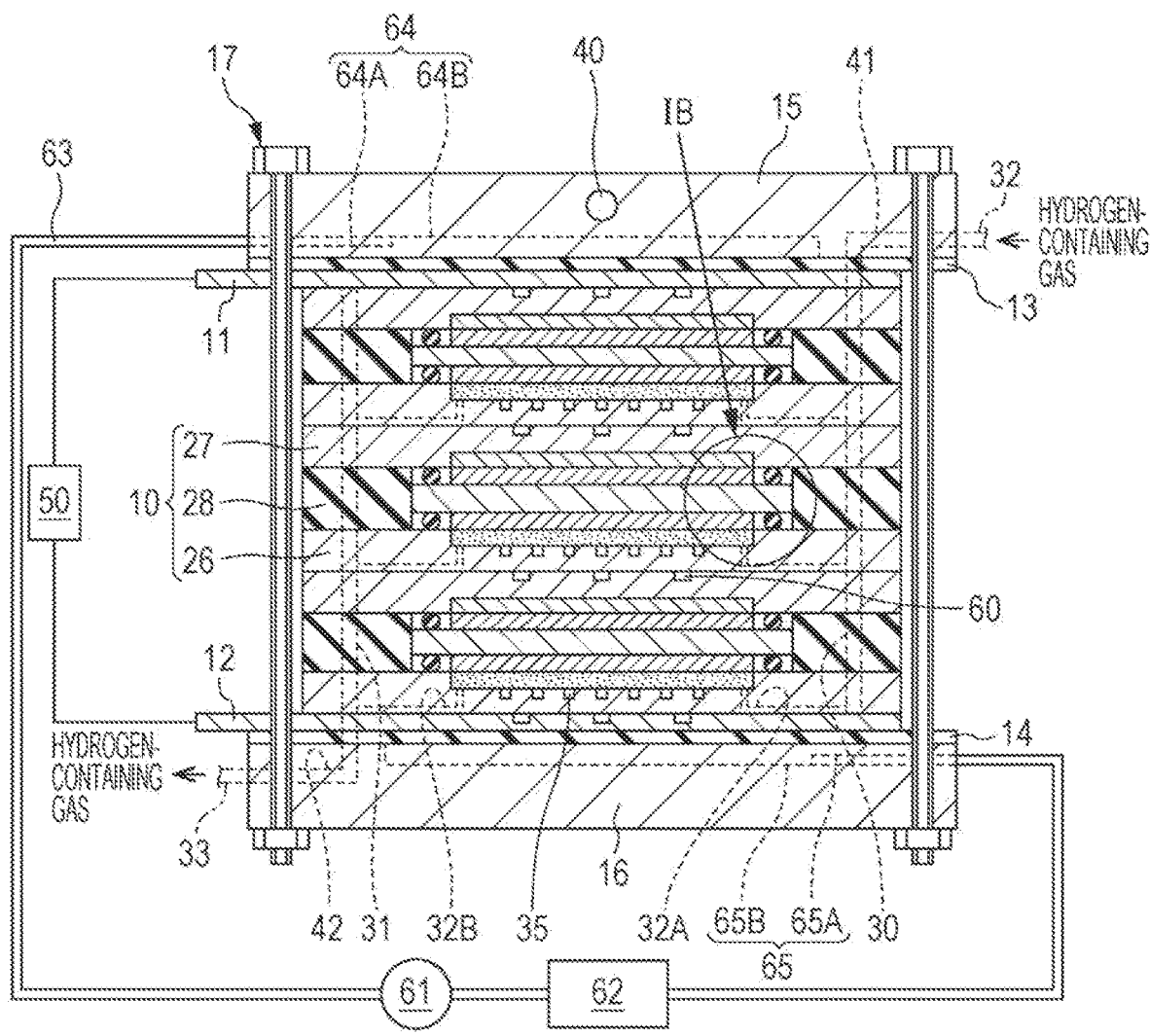
FIG. 1A is a diagram illustrating an example of an electrochemical hydrogen pump according to a first embodiment.

The efficiency of hydrogen compression action of a compression apparatus was studied and, as a result, the following knowledges were obtained.

In the case where an electrochemical compression apparatus includes a stack of a plurality of electrochemical cells each including an anode, a cathode, and an electrolyte membrane interposed therebetween, the higher the water content in the electrolyte membrane, that is, the higher the wetness of the electrolyte membrane, the higher the electrical conductivity of the electrolyte membrane. Accordingly, it is common to humidify a low-pressure hydrogen-containing gas fed to the anode of such a compression apparatus with a humidifier. It is also common to adjust the dew point of a hydrogen-containing gas fed to the anode of the stack such that, for example, the relative humidity of the hydrogen-containing gas present inside the stack reaches substantially 100% or approaches 100%.

However, in the case where such a highly humidified hydrogen-containing gas is used, when the channel members constituting the channel through which the hydrogen-containing gas flows are not heated to a sufficient degree, water vapor contained in the hydrogen-containing gas may condense due to a reduction in the temperature of the hydrogen-containing gas. The condensed water may cause channel blockage (flooding) in the channel members. If the flow of the hydrogen-containing gas is blocked due to the flooding, the efficiency of hydrogen compression action of the compression apparatus may be reduced.

The stack included in the above compression apparatus is commonly formed such that each of the electrochemical cells includes a pair of separators each disposed on the outside surface of a corresponding one of the anode and the cathode of the electrochemical cell. The electrochemical cells and the separators are stacked alternately on top of one another to form a multilayer body including, for example, about several tens to several hundreds of the electrochemical cells. The resulting multilayer body (stack) is sandwiched between a pair of end plates, with a pair of insulating plates and the like interposed between the end plates and the multilayer body. The end plates are fastened with a plurality of fasteners (e.g., bolts and nuts). This is the common multilayer fastening structure.

Among the components of the above multilayer structure, the end plates are likely to dissipate heat to the outside air. Therefore, if the temperature of the hydrogen-containing gas that flows through channels formed in the end plates is reduced, water vapor contained in the hydrogen-containing gas is likely to condensate to cause flooding in the channels formed in the end plates.

With regard to the above circumstances, the inventors of the present disclosure conducted extensive studies and consequently conceived an idea of forming channels in the end plates, through which a heating medium flows.

Specifically, a compression apparatus according to a first aspect of the present disclosure includes a stack including a plurality of electrochemical cells stacked on top of one another, the electrochemical cells each including an anode, a cathode, and an electrolyte membrane interposed between the anode and the cathode; a pair of insulating plates disposed at respective ends of the stack in a direction in which the electrochemical cells are stacked; a pair of first end plates disposed on outside surfaces of the respective insulating plates; and a voltage applicator that applies a voltage between the anode and the cathode. Upon the voltage applicator applying the voltage, the compression apparatus causes hydrogen included in a hydrogen-containing gas fed to the anode to move to the cathode and produces compressed hydrogen. The first end plates have a first channel through which the hydrogen-containing gas fed to the anode flows and a second channel through which a heating medium flows, the first and second channels being formed in the first end plates. The compression apparatus further includes a heater that heats the heating medium.

The compression apparatus according to the above aspect may suppress a reduction in the efficiency of hydrogen compression action, compared with the compression apparatuses known in the related art. Specifically, among the components of the multilayer structure including the stack of the electrochemical cells, the insulating plates, and the first end plates, the first end plates are likely to dissipate heat to the outside air. Therefore, if the temperature of the hydrogen-containing gas that flows through the first channels formed in the first end plates is reduced due to the above heat dissipation, water vapor contained in the hydrogen-containing gas may condense.

However, in the compression apparatus according to this aspect, since the first end plates have a second channel through which a heating medium the temperature of which is controlled with a heater flows, the first end plates can be heated by the heat of the heating medium. Consequently, in the compression apparatus according to this aspect, the reduction in the temperature of the hydrogen-containing gas that flows through the first channels may be suppressed, compared with the case where the first end plates are not heated by the heat of the heating medium. This reduces the likelihood of the flooding being caused in the first channels due to the condensation of water vapor contained in the hydrogen-containing gas. As a result, in the compression apparatus according to this aspect, the flow of the hydrogen-containing gas through the first channels can be maintained appropriately. This suppresses a reduction in the efficiency of hydrogen compression action.

A compression apparatus according to a second aspect of the present disclosure is based on the compression apparatus according to the first aspect and may further include a pair of heat insulating materials disposed on outside surfaces of the respective first end plates.

Since the compression apparatus according to this aspect includes the heat insulating materials disposed on the outside surfaces of the respective first end plates, the dissipation of heat from the first end plates to the outside air may be suppressed compared with the case where the heat insulating materials are not disposed.

Consequently, in the compression apparatus according to this aspect, the likelihood of the flooding being caused in the first channels due to the condensation of water vapor contained in the hydrogen-containing gas may be further reduced as a result of the suppression of heat dissipation.

Furthermore, in the compression apparatus according to this aspect, the amount of heat that needs to be applied to the heating medium by the heater for heating the first end plates can be reduced as a result of the suppression of heat dissipation. Consequently, in the compression apparatus according to this aspect, for example, when the temperature of the stack needs to be increased upon the start of operation, the amount of time required for starting the operation of the compression apparatus can be reduced in the case where the amount of heat applied to the heating medium by the heater per unit time is constant.

A compression apparatus according to a third aspect of the present disclosure is based on the compression apparatus according to the second aspect and may further include a pair of second end plates disposed on outside surfaces of the respective heat insulating materials.

Since the compression apparatus according to the present disclosure produces high-pressure compressed hydrogen, the end plates are required to have high stiffness.

Since the compression apparatus according to this aspect includes the second end plates in addition to the first end plates, the stiffness of the entirety of the end plates may be enhanced. Moreover, since a heat insulating material is interposed between each pair of the first and second end plates, the heat capacity of the multilayer structure constituting the compression apparatus can be reduced. In other words, in the compression apparatus according to this aspect, even in the case where second end plates are disposed on the first end plates, an increase in the amount of heat that needs to be applied to the heating medium by the heater for heating the first end plates can be suppressed due to the heat-insulation effect of the heat insulating materials.

In addition, in the compression apparatus according to this aspect, each of the heat insulating materials can be sandwiched between a pair of the first and second end plates. This may reduce the detachment, peeling, and the like of the heat insulating materials.

Furthermore, the second end plates do not necessarily have the first channel, through which a highly humidified hydrogen-containing gas flows. In such a case, it is not necessary to heat the second end plates by the heat of the heating medium. This suppresses an increase in the amount of heat applied to the heating medium by the heater.

Embodiments of the present disclosure are described with reference to the attached drawings below. The following embodiments are merely illustrative of examples of the foregoing aspects. Therefore, the shapes, materials, components, the arrangement of the components, the connections between the components, etc. are merely examples and do not limit the above-described aspects unless otherwise specified in the claims. Among the components described below, components that are not described in the independent claims, which indicate the highest concepts of the above-described aspects, are described as optional components. The description of components denoted by the same reference numeral in the drawings may be omitted. In the drawings, components are illustrated schematically for ease of comprehension; the shapes of the components, the dimensional ratio between the components, etc. are not always accurate.

First Embodiment

In the following embodiment, the structure and action of an electrochemical hydrogen pump, which is an example of the above-described compression apparatus, are described.

Apparatus Structure

Figure 1B:
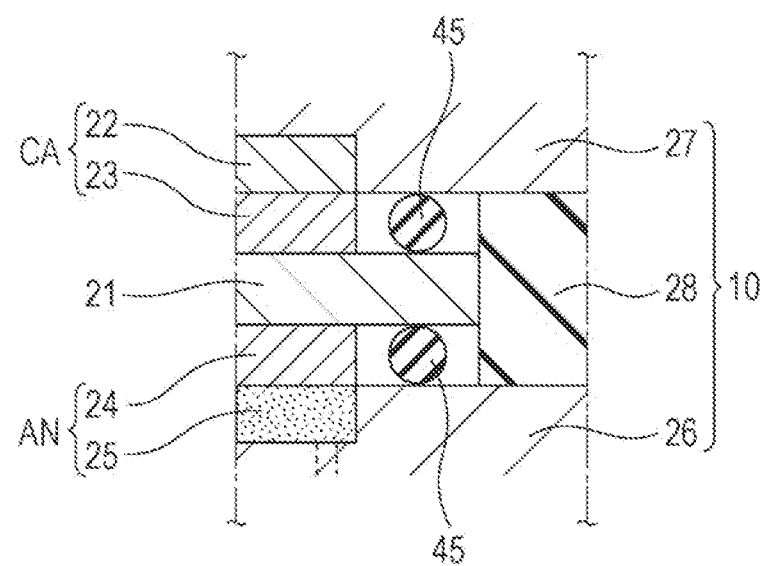
FIG. 1B is a magnified view of the part denoted by "IB" in FIG. 1A.

FIG. 1A is a diagram illustrating an example of an electrochemical hydrogen pump according to a first embodiment. FIG. 1B is a magnified view of the part denoted by "IB" in FIG. 1A.

In the example illustrated in FIGS. 1A and 1B, an electrochemical hydrogen pump 100 includes a stack including a plurality of electrochemical cells 10 stacked on top of one another, each of the electrochemical cells 10 including an anode AN, a cathode CA, and an electrolyte membrane 21 interposed therebetween.

Although three electrochemical cells 10 are stacked on top of one another in FIG. 1A, the number of the electrochemical cells 10 is not limited to this. That is, the number of the electrochemical cells 10 may be set appropriately in accordance with the operating conditions, such as the amount of hydrogen compressed by the electrochemical hydrogen pump 100.

The electrochemical cell 10 includes an electrolyte membrane 21, an anode AN, a cathode CA, a cathode separator 27, an anode separator 26, and an insulator 28.

In the electrochemical cell 10, the electrolyte membrane 21, an anode catalyst layer 24, a cathode catalyst layer 23, an anode power feeder 25, a cathode power feeder 22, the anode separator 26, and the cathode separator 27 are stacked on top of one another.

The anode AN is disposed on one of the principal surfaces of the electrolyte membrane 21. The anode AN is an electrode including the anode catalyst layer 24 and the anode power feeder 25. An O-ring 45 is disposed on the anode separator 26 so as to surround the anode catalyst layer 24 included in the anode AN when viewed in plan. This enables the anode AN to be sealed with the O-ring 45 in an appropriate manner.

The cathode CA is disposed on the other principal surface of the electrolyte membrane 21. The cathode CA is an electrode including the cathode catalyst layer 23 and the cathode power feeder 22. An O-ring 45 is disposed on the cathode separator 27 so as to surround the cathode catalyst layer 23 included in the cathode CA when viewed in plan. This enables the cathode CA to be sealed with the O-ring 45 in an appropriate manner.

Thus, the electrolyte membrane 21 is sandwiched between the anode AN and the cathode CA so as to come into contact with the anode catalyst layer 24 and the cathode catalyst layer 23.

The electrolyte membrane 21 is a proton-conducting polymer membrane. The electrolyte membrane 21 may be any polymer membrane having protonic conductivity.

Examples of the electrolyte membrane 21 include, but are not limited to, a fluorine-based polymer electrolyte membrane and a hydrocarbon polymer electrolyte membrane. Specific examples of the electrolyte membrane 21 include Nafion (registered trademark, produced by Du Pont) and Aciplex (registered trademark, produced by Asahi Kasei Corporation).

The anode catalyst layer 24 is arranged to abut against one of the principal surfaces of the electrolyte membrane 21. Examples of a catalyst metal included in the anode catalyst layer 24 include, but are not limited to, platinum.

The cathode catalyst layer 23 is arranged to abut against the other principal surface of the electrolyte membrane 21. Examples of a catalyst metal included in the cathode catalyst layer 23 include, but are not limited to, platinum.

Examples of a catalyst carrier for the cathode catalyst layer 23 and the anode catalyst layer 24 include, but are not limited to, carbon particles, such as carbon black particles and graphite particles; and electrically conductive oxide particles.

In the cathode catalyst layer 23 and the anode catalyst layer 24, highly-dispersed microparticles of the catalyst metal are supported on the catalyst carrier. In addition, a proton-conducting ionomer component is commonly added to the cathode catalyst layer 23 and the anode catalyst layer 24 in order to increase the electrode reaction field.

The cathode power feeder 22 is disposed on the cathode catalyst layer 23. The cathode power feeder 22 is composed of a porous material and has electrical conductivity and gas diffusibility. The cathode power feeder 22 desirably has a certain degree of elasticity that enables the cathode power feeder 22 to appropriately follow the displacement and deformation of the components which may occur during the operation of the electrochemical hydrogen pump 100 due to the pressure difference between the cathode CA and the anode AN. In the electrochemical hydrogen pump 100 according to this embodiment, a member composed of carbon fibers is used as a cathode power feeder 22. Porous carbon fiber sheets, such as a carbon paper sheet, a carbon cloth, and a carbon felt sheet, may also be used. A carbon fiber sheet is not necessarily used as a substrate for the cathode power feeder 22; other examples of the substrate for the cathode power feeder 22 include a sintered body of metal fibers produced using titanium, a titanium alloy, or stainless steel as a raw material; and a sintered body of metal particles produced using any of the above raw materials.

The anode power feeder 25 is disposed on the anode catalyst layer 24. The anode power feeder 25 is composed of a porous material and has electrical conductivity and gas diffusibility. The anode power feeder 25 desirably has a high stiffness that reduces the displacement and deformation of the components which may occur during the operation of the electrochemical hydrogen pump 100 due to the pressure difference between the cathode CA and the anode AN.

Specific examples of a substrate for the anode power feeder 25 include a sintered body of a fiber or powder produced using titanium, a titanium alloy, stainless steel, carbon, or the like as a raw material, an expanded metal, a metal mesh, and a perforated metal.

The anode separator 26 is a member disposed on the anode AN. The cathode separator 27 is a member disposed on the cathode CA. Specifically, a recess is formed at the center of the anode separator 26, and the anode power feeder 25 is accommodated in the recess. A recess is formed at the center of the cathode separator 27. The cathode power feeder 22 is accommodated in the recess.

The anode separator 26 and the cathode separator 27 may be composed of a metal sheet made of titanium, a stainless steel, or the like. In the case where the metal sheet is made of a stainless steel, among various types of stainless steels, SUS316L and SUH660 are excellent in terms of acid resistance, hydrogen embrittlement resistance, etc.

As illustrated in FIG. 1A, the principal surface of the cathode separator 27 which is in contact with the cathode power feeder 22 does not have a cathode gas channel formed therein and is constituted by a flat plane. This increases the contact area between the cathode power feeder 22 and the cathode separator 27, compared with the case where a cathode gas channel is formed in the principal surface of the cathode separator 27 and, as a result, reduces the contact resistance between the cathode power feeder 22 and the cathode separator 27 in the electrochemical hydrogen pump 100.

On the other hand, the principal surface of the anode separator 26 which is in contact with the anode power feeder 25 has a serpentine anode gas channel 35 formed therein, which includes, for example, a plurality of U-shaped turnaround portions and a plurality of straight portions when viewed in plan. The straight portions of the anode gas channel 35 extend in a direction perpendicular to the cross section illustrated in FIG. 1A. Note that the above-described anode gas channel 35 is merely illustrative; the anode gas channel is not limited to the above example. For example, the anode gas channel may be constituted by a plurality of straight channels.

A ring-like and flat plate-like insulator 28 is interposed between the cathode separator 27 and the anode separator 26 of each of the electrochemical cells 10 included in the electrochemical hydrogen pump 100 so as to surround the electrolyte membrane 21. Examples of the material constituting the insulator 28 include, but are not limited to, a fluorine rubber. This eliminates the risk of short circuit between the cathode separator 27 and the anode separator 26 in the electrochemical cell 10 in an appropriate manner.

Moreover, a heating medium branch channel 60 is formed in each of the cathode separators 27 and the power feed plate 12. Although the heating medium branch channel 60 is constituted by a serpentine channel groove formed in the anode separator 26-side principal surface of the cathode separator 27 or the power feed plate 12 in this embodiment, the heating medium branch channel is not limited to this; the heating medium branch channel 60 may be formed in the principal surface of the anode separator 26. This enables the temperature of the electrochemical cell 10 to be controlled in an appropriate manner by adjusting the temperature, flow rate, etc. of a heating medium that flows through the heating medium branch channel 60 during the operation of the electrochemical hydrogen pump 100. Examples of the heating medium that flows through the heating medium branch channel 60 include, but are not limited to, liquid water and antifreeze. Note that using liquid water as a heating medium increases ease of handling of the heating medium.

Although not illustrated in the drawing, the cathode separator 27 and the anode separator 26 adjacent to each other may be merged with each other to form a bipolar plate. In such a case, the bipolar plate serves as both anode separator 26 of one of an adjacent pair of electrochemical cells 10 and cathode separator 27 of the other electrochemical cell 10. This reduces the number of components of the electrochemical hydrogen pump 100. For example, the number of the separators can be reduced. Furthermore, sealing members interposed between the separators can be omitted. In addition, merging the anode separator 26 and the cathode separator 27 with each other eliminates the gap present at the joint between the anode separator 26 and the cathode separator 27 and consequently reduces the contact resistance therebetween.

The above-described MEA is sandwiched between the cathode separator 27 and the anode separator 26 in the above-described manner to form the electrochemical cell 10.

As illustrated in FIG. 1A, the electrochemical hydrogen pump 100 includes a pair of power feed plates 11 and 12 disposed at the respective ends of the stack of the electrochemical cells 10 in the direction in which the electrochemical cells 10 are stacked; a pair of insulating plates 13 and 14 disposed on the outside surfaces of the power feed plates 11 and 12, respectively; and a pair of first end plates 15 and 16 disposed on the outside surfaces of the insulating plates 13 and 14, respectively.

The electrochemical hydrogen pump 100 also includes fasteners 17 with which the stack, the power feed plates 11 and 12, the insulating plates 13 and 14, and the first end plates 15 and 16 are fastened in the above stacking direction.

In the example illustrated in FIG. 1A, the first end plate 15 constitutes a cathode end plate disposed on one of the cathode separators 27 which is located at one of the ends in the stacking direction, in which the members constituting the electrochemical cells 10 are stacked, with the power feed plate 11 and the insulating plate 13 interposed between the cathode separators 27 and the cathode end plate. The first end plate 16 constitutes an anode end plate disposed on one of the anode separators 26 which is located at the other end in the stacking direction, in which the members constituting the electrochemical cells 10 are stacked, with the power feed plate 12 and the insulating plate 14 interposed between the anode separators 26 and the anode end plate.

As illustrated in FIG. 1A, the first end plate 15 has a cathode gas discharge channel 40 through which the high-pressure hydrogen compressed in the cathode CA flows, an anode gas feed channel 41 through which a hydrogen-containing gas fed from the outside to the anode AN flows, and a heating medium channel 64 through which a heating medium flows, which are formed in the first end plate 15. Note that, although the heating medium channel 64 in this embodiment includes a meeting portion 64A constituted by a communicating hole formed in the first end plate 15 and a circular portion 64B constituted by a circular channel groove formed in the insulating plate 13-side principal surface of the first end plate 15, the structure of the heating medium channel is not limited to this. The anode gas feed channel 41 corresponds to the first channel according to the present disclosure, and the heating medium channel 64 corresponds to the second channel according to the present disclosure.

The first end plate 16 has an anode gas discharge channel 42 through which a hydrogen-containing gas discharged from the anode AN flows, a heating medium channel 65 through which a heating medium flows, and, although not illustrated in the drawing, a cathode gas discharge channel through which the high-pressure hydrogen compressed in the cathode CA flows, which are formed in the first end plate 16. Note that, although the heating medium channel 65 in this embodiment includes a meeting portion 65A constituted by a communicating hole formed in the first end plate 16 and a circular portion 65B constituted by a circular channel groove formed in the insulating plate 14-side principal surface of the first end plate 16, the structure of the heating medium channel is not limited to this.

Examples of the heating medium that flows through the heating medium channels 64 and 65 include, but are not limited to, liquid water and antifreeze. Using liquid water as a heating medium increases ease of handling of the heating medium.

Note that the structures of the above gas channels formed in the first end plates 15 and 16 are merely illustrative; the structures of the gas channels are not limited to the above example. For example, the cathode gas discharge channel through which the high-pressure hydrogen compressed in the cathode CA flows may be formed in only one of the first end plates 15 and 16 and is not necessarily formed in any of the first end plates 15 and 16. For example, the anode gas discharge channel through which a hydrogen-containing gas discharged from the anode AN flows may be formed in the first end plate 15, while the anode gas feed channel through which a hydrogen-containing gas fed from the outside to the anode AN flows is formed in the first end plate 16. The anode gas discharge channel is not necessarily formed in any of the first end plates 15 and 16.

The fasteners 17 may be any fasteners capable of fastening the stack of the electrochemical cells 10, the power feed plates 11 and 12, the insulating plates 13 and 14, and the first end plates 15 and 16 in the above stacking direction. Examples of the fasteners 17 include bolts and nuts with conical spring washer.

Thus, in the electrochemical hydrogen pump 100 according to this embodiment, a plurality of the electrochemical cells 10 are appropriately held by the fastening pressure of the fasteners 17 in the above stacking direction, while stacked on top of one another. This enhances the sealing capability of the sealing members interposed between the members constituting the electrochemical cells 10 to an adequate degree and reduces the contact resistance between the members.

In the electrochemical hydrogen pump 100 according to this embodiment, a plurality of the electrochemical cells 10 are appropriately held by the fastening pressure of the fasteners 17 in the above stacking direction, while stacked on top of one another as a result of bolts that serve as fasteners 17 penetrating the power feed plates 11 and 12, the insulating plates 13 and 14, and the first end plates 15 and 16.

The anode gas feed channel 41 formed in the first end plate 15 illustrated in FIG. 1A is connected to an anode gas entry pathway 32. The anode gas entry pathway 32 may be constituted by, for example, a piping through which a hydrogen-containing gas fed to the anode AN flows.

The anode gas entry pathway 32 is communicated with a cylindrical anode gas entry manifold 30 through the anode gas feed channel 41. The anode gas entry manifold 30 is constituted by a series of through-holes formed in the members constituting the electrochemical cells 10.

In the electrochemical hydrogen pump 100 according to this embodiment, each of the electrochemical cells 10 has a first communicating path 32A through which the anode gas entry manifold 30 and the anode gas channel 35 are communicated with each other, the first communicating path 32A being formed in a principal surface of the anode separator 26 in which the anode AN of the electrochemical cell 10 is not disposed. For example, the first communicating path 32A may be constituted by a channel groove and a communicating hole that are formed in the anode separator 26. The first communicating path 32A is arranged to extend from one of the ends of the serpentine anode gas channel 35 to the anode gas entry manifold 30.

Thus, the anode gas entry manifold 36 is communicated with an end of the anode gas channel 35 included in each of the electrochemical cells 10 through the first communicating path 32A. This enables a hydrogen-containing gas fed from the anode gas entry pathway 32 to the anode gas entry manifold 30 to be distributed to each of the electrochemical cells 10 through the first communicating path 32A of the electrochemical cell 10. While the distributed hydrogen-containing gas passes through the anode gas channel 35, the hydrogen-containing gas is fed from the anode power feeder 25 to the anode catalyst layer 24.

The anode gas discharge channel 42 formed in the first end plate 16 illustrated in FIG. 1A is connected to an anode gas delivery pathway 33. The anode gas delivery pathway 33 may be constituted by, for example, a piping through which a hydrogen-containing gas discharged from the anode AN flows.

The anode gas delivery pathway 33 is communicated with a cylindrical anode gas delivery manifold 31 through the anode gas discharge channel 42. The anode gas delivery manifold 31 is constituted by a series of through-holes formed in the members constituting the electrochemical cells 10.

In the electrochemical hydrogen pump 100 according to this embodiment, each of the electrochemical cells 10 has a second communicating path 32B through which the anode gas delivery manifold 31 and the anode gas channel 35 are communicated with each other, the second communicating path 32B being formed in a principal surface of the anode separator 26 in which the anode AN of the electrochemical cell 10 is not disposed. For example, the second communicating path 32B may be constituted by a channel groove and a communicating hole that are formed in the anode separator 26. The second communicating path 32B is arranged to extend from the other end of the serpentine anode gas channel 35 to the anode gas delivery manifold 31.

Thus, the anode gas delivery manifold 31 is communicated with the other end of the anode gas channel 35 included in each of the electrochemical cells 10 through the second communicating path 32B. This enables the hydrogen-containing gas that has passed through the anode gas channel 35 of each of the electrochemical cells 10 to be fed to the anode gas delivery manifold 31 through the second communicating path 32B. The hydrogen-containing gases merge with one another in the anode gas delivery manifold 31. The merged hydrogen-containing gas is delivered to the anode gas delivery pathway 33.

The cathode gas discharge channel 40 formed in the first end plate 15 illustrated in FIG. 1A is connected to a cathode gas delivery pathway (not illustrated in the drawing). The cathode gas delivery pathway may be constituted by, for example, a piping through which high-pressure hydrogen (H$_2$) discharged from the cathode CA flows.

The cathode gas delivery pathway is communicated with a cylindrical cathode gas delivery manifold (not illustrated in the drawing) through the cathode gas discharge channel 40. The cathode gas delivery manifold is constituted by a series of through-holes formed in the members constituting the electrochemical cells 10.

In each of the electrochemical cells 10 included in the electrochemical hydrogen pump 100 according to this embodiment, the cathode separator 27 has a communicating pathway (not illustrated in the drawing) formed therein, through which the inside of the recess of the cathode separator 27 and the inside of the cathode gas delivery manifold are communicated with each other.

This enables the high-pressure hydrogen compressed in the cathode CA to be discharged to the cathode gas delivery pathway after passing through the communicating pathway, the cathode gas delivery manifold, and the cathode gas discharge channel 40 in this order, during the operation of the electrochemical hydrogen pump 100.

The first end plates 15 and 16 may be composed of a metal sheet made of titanium, stainless steel, or the like. In the case where the metal sheet is made of a stainless steel, among various types of stainless steels, SUS316L and SUH660 are excellent in terms of acid resistance, hydrogen embrittlement resistance, etc.

As illustrated in FIG. 1A, the electrochemical hydrogen pump 100 includes a pump 61, a heater 62, and a heating medium circulation pathway 63.

The heating medium circulation pathway 63 is a channel through which the heating medium circulates by passing the heating medium channel 65, the heating medium branch channel 60, and the heating medium channel 64.

Specifically, in the example illustrated in FIG. 1A, the first end plate 16 has an end of the heating medium circulation pathway 63 formed therein so as to be connected to a heating medium inlet of the meeting portion 65A of the heating medium channel 65. The first end plate 15 has the other end of the heating medium circulation pathway 63 formed therein so as to be connected to a heating medium outlet of the meeting portion 64A of the heating medium channel 64. The heating medium circulation pathway 63 may be constituted by, for example, a piping through which the heating medium flows.

The pump 61 is a device that is disposed on the heating medium circulation pathway 63 and causes the heating medium that flows through the heating medium circulation pathway 63 to circulate. The pump 61 may be any type of device capable of circulating the above heating medium. Examples of the pump 61 include, but are not limited to, a fixed displacement piston pump and a rotary pump.

The heater 62 is a device that heats the heating medium. The heater 62 may have any structure capable of heating the heating medium. Examples of the heater 62 include, but are not limited to, an electric heater disposed on the heating medium circulation pathway 63. The heating medium circulation pathway 63 may be provided with a temperature detector (not illustrated in the drawing), such as a thermocouple, disposed therein. In such a case, the amount of heat applied to the heating medium by the heater 62 can be controlled such that the temperature of the heating medium circulating through the heating medium circulation pathway 63 is set to an intended temperature on the basis of the temperature detected with the temperature detector.

In the example illustrated in FIG. 1A, the circular portion 65B of the heating medium channel 65 formed in the first end plate 16 and the heating medium branch channel 60 are communicated with each other through a cylindrical heating medium entry manifold (not illustrated in the drawings). The heating medium entry manifold is constituted by a series of through-holes formed in the members constituting the electrochemical cells 10. In each of the cathode separators 27 and the power feed plate 12, a groove-like communicating path (not illustrated in the drawings) is branched from the heating medium entry manifold, and the end of the communicating path is communicated with an end of the serpentine heating medium branch channel 60 formed in the cathode separator 27 or the power feed plate 12.

The circular portion 64B of the heating medium channel 64 formed in the first end plate 15 and the heating medium branch channel 60 are communicated with each other through a cylindrical heating medium delivery manifold (not illustrated in the drawings). The heating medium delivery manifold is constituted by a series of through-holes formed in the members constituting the electrochemical cells 10. In each of the cathode separators 27 and the power feed plate 12, a groove-like communicating path (not illustrated in the drawings) is branched from the heating medium delivery manifold, and the end of the communicating path is communicated with the other end of the serpentine heating medium branch channel 60 formed in the cathode separator 27 or the power feed plate 12.

The heating medium fed from the heating medium circulation pathway 63 is delivered to the heating medium entry manifold through the meeting portion 65A of the heating medium channel 65. While the heating medium flows through the heating medium entry manifold, it is distributed to the circular portion 65B of the heating medium channel 65, the heating medium branch channel 60 of each of the cathode separators 27 and the power feed plate 12, and the circular portion 64B of the heating medium channel 64. The distributed heating media pass through the circular portion 65B of the heating medium channel 65, the heating medium branch channels 60, or the circular portion 64B of the heating medium channel 64 and then merge with one another in the heating medium delivery manifold. The merged heating medium is delivered to the meeting portion 64A of the heating medium channel 64 and then discharged to the heating medium circulation pathway 63.

In the above-described manner, the heating medium heated by the heater 62 is caused to circulate through the heating medium circulation pathway 63 by passing through the heating medium channel 65, the heating medium branch channel 60, and the heating medium channel 64 by the action of the pump 61.

The above-described structure of the channels through which the heating medium flows is merely illustrative; the channel structure is not limited to this. For example, the heating medium inlet may be formed in the first end plate 15, while the heating medium outlet is formed in the first end plate 16. For example, a pathway through which the heating medium circulates through the heating medium channels 64 and 65 and a pathway through which the heating medium circulates through the heating medium branch channel 60 may be different from each other. Note that the channel structure can be simplified when, as described above, the channel through which the heating medium circulates through the heating medium channel 64, the heating medium channel 65, and heating medium branch channel 60 is constituted by a single channel.

As illustrated in FIG. 1A, the electrochemical hydrogen pump 100 includes a voltage applicator 50.

The voltage applicator 50 is a device that applies a voltage between the anode AN and the cathode CA. Specifically, a high potential of the voltage applicator 50 is applied to the anode AN, while a low potential of the voltage applicator 50 is applied to the cathode CA. The voltage applicator 50 may be any device capable of applying a voltage between the anode AN and the cathode CA. For example, the voltage applicator 50 may be a device that controls the voltage applied between the anode AN and the cathode CA. When the voltage applicator 50 is connected to a direct-current power source, such as a battery, a solar cell, or a fuel cell, the voltage applicator 50 includes a DC-to-DC converter. When the voltage applicator 50 is connected to an alternating-current power source, such as a commercial power source, the voltage applicator 50 includes an AC-to-DC converter.

The voltage applicator 50 may be, for example, a voltage-type power source, which controls the voltage applied between the anode AN and the cathode CA such that the voltage fed to the electrochemical cells 10 is maintained to be a predetermined value.

In the example illustrated in FIG. 1A, a low-potential-side terminal of the voltage applicator 50 is connected to the power feed plate 11, while a high-potential-side terminal of the voltage applicator 50 is connected to the power feed plate 12. The power feed plate 11 is arranged to come into electrical contact with the cathode separator 27 located at one of the ends of the multilayer body in the above stacking direction. The power feed plate 12 is arranged to come into electrical contact with the anode separator 26 located at the other end of the multilayer body in the stacking direction.

In the above-described manner, upon the voltage applicator 50 applying the above voltage, the electrochemical hydrogen pump 100 causes hydrogen included in the hydrogen-containing gas fed to the anode AN to move to the cathode CA through the electrolyte membrane 21 and produces compressed hydrogen in the cathode CA.

Although not illustrated in the drawings, a hydrogen feed system including the above-described electrochemical hydrogen pump 100 may be produced. In such a case, devices required in the hydrogen feed action of the hydrogen feed system may be optionally formed as needed.

For example, the hydrogen feed system may include a dew point regulator (e.g., a humidifier) that controls the dew point of a mixed gas of the high-humidity hydrogen-containing gas discharged from the anode AN and the low-humidity hydrogen-containing gas fed from an external hydrogen feed source. The external hydrogen feed source may be a water electrolyzer, a reformer, a hydrogen tank, or the like.

The hydrogen feed system may also include, for example, a temperature sensor that detects the temperature of the electrochemical hydrogen pump 100, a hydrogen storage that temporarily stores the hydrogen discharged from the cathode CA of the electrochemical hydrogen pump 100, and a pressure sensor that detects the pressure of the hydrogen gas stored in the hydrogen storage.

Note that the above-described structure of the electrochemical hydrogen pump 100 and the above-described various devices included in the hydrogen feed system, which are not illustrated in the drawings, are merely illustrative; the structure of the electrochemical hydrogen pump 100 and devices included in the hydrogen feed system are not limited to the above-described examples. For example, a structure in which the anode gas delivery manifold 31 is omitted and the whole amount of hydrogen included in the hydrogen-containing gas fed to the anodes AN through the anode gas entry manifold 30 is compressed in the cathodes CA, that is, a "dead-end" structure, may be employed.

Action

An example of the hydrogen compression action of the electrochemical hydrogen pump 100 is described below with reference to the attached drawings.

The action described below may be performed by, for example, a computing circuit of a controller, which is not illustrated in the drawings, reading a control program from a memory circuit of the controller. Note that the action described below is not necessarily performed by a controller; part of the action may be performed by the operator. In the following example, a case where the action is controlled using the controller is described.

First, a low-pressure hydrogen-containing gas that flows through the anode gas entry pathway 32 is fed to the anode AN of the electrochemical hydrogen pump 100 through the anode gas feed channel 41, the anode gas entry manifold 30, and the first communicating path 32A, and a voltage applied by the voltage applicator 50 is fed to the electrochemical hydrogen pump 100. The hydrogen-containing gas that has passed through the anode AN is discharged to the anode gas delivery pathway 33 through the second communicating path 32B, the anode gas delivery manifold 31, and the anode gas discharge channel 42.

While the hydrogen-containing gas is fed to the anode AN of the electrochemical hydrogen pump 100, the controller causes the heater 62 to heat the heating medium and causes the pump 61 to pass the heating medium through the heating medium channel 64. Specifically, after the temperature of the heating medium has been adjusted to a suitable temperature with the heater 62, the heating medium is caused to circulate through the heating medium circulation pathway 63 by passing through the heating medium channel 65, the heating medium branch channel 60, and the heating medium channel 64 by the action of the pump 61.

Upon the application of the voltage, hydrogen molecules are split into protons and electrons in the anode catalyst layer 24 of the anode AN as a result of an oxidation reaction (Formula (1)). The protons transfers through the electrolyte membrane 21 and move to the cathode catalyst layer 23, while the electrons move to the cathode catalyst layer 23 through the voltage applicator 50.

In the cathode catalyst layer 23, hydrogen molecules are reproduced as a result of a reduction reaction (Formula (2)). It is known that, when the protons transfer through the electrolyte membrane 21, a predetermined amount of water also moves from the anode AN to the cathode CA as electro-osmosis water, accompanying with the protons.

The hydrogen ($H_2$) produced in the cathode CA can be compressed by increasing the pressure loss of the cathode gas delivery pathway formed in the first end plate 15 using a flow rate regulator, which is not illustrated in the drawings. Examples of the flow rate regulator include a back pressure valve and a control valve disposed in the cathode gas delivery pathway.

$$\text{Anode: } H_2 \text{ (low pressure)} \rightarrow 2H^+ + 2e^- \qquad (1)$$

$$\text{Cathode: } 2H^+ + 2e^- \rightarrow H_2 \text{ (high pressure)} \qquad (2)$$

As described above, upon the voltage applicator 50 applying a voltage, the electrochemical hydrogen pump 100 causes hydrogen included in a hydrogen-containing gas fed to the anode AN to move to the cathode CA and produces high-pressure hydrogen compressed in the cathode CA. The hydrogen compression action of the electrochemical hydrogen pump 100 is performed in the above-described manner. The hydrogen compressed in the cathode CA is passed through the communicating pathway, the cathode gas delivery manifold, and the cathode gas discharge channel 40 and then temporarily stored in, for example, a hydrogen storage through the cathode gas delivery pathway. The hydrogen stored in the hydrogen storage is fed to a body that requires hydrogen at any time as needed. Examples of the body that requires hydrogen include a fuel cell, which generates power by using hydrogen.

As described above, the electrochemical hydrogen pump 100 according to this embodiment may suppress a reduction in the efficiency of hydrogen compression action, compared with the compression apparatuses known in the related art. Specifically, among the components of the multilayer structure including the stack of the electrochemical cells 10, the power feed plates 11 and 12, the insulating plates 13 and 14, and the first end plates 15 and 16, the first end plates 15 and 16 are likely to dissipate heat to the outside air. Therefore, if the temperature of the hydrogen-containing gas that flows through the anode gas feed channel 41 formed in the first end plate 15 and the temperature of the hydrogen-containing gas that flows through the anode gas feed channel 42 formed in the first end plate 16 are reduced due to the above heat dissipation, water vapor contained in the hydrogen-containing gases may condense.

However, the electrochemical hydrogen pump 100 according to this embodiment includes the heating medium channels 64 and 65 formed in the first end plates 15 and 16, respectively, through which the heating medium the temperature of which is controlled with the heater 62 flows. This enables the first end plates 15 and 16 to be heated by the heat of the heating medium. Thus, the electrochemical hydrogen pump 100 according to this embodiment may suppress a reduction in the temperature of the hydrogen-containing gas that flows through the anode gas feed channel 41 and the anode gas discharge channel 42 compared with the case where the first end plates 15 and 16 are not heated by the heat of the heating medium. This reduces the likelihood of flooding being caused in the anode gas feed channel 41 and the anode gas discharge channel 42 due to the condensation of water vapor contained in the hydrogen-containing gas. Consequently, in the electrochemical hydrogen pump 100 according to this embodiment, the flow of the hydrogen-containing gas through the anode gas feed channel 41 and the anode gas discharge channel 42 can be maintained appropriately. This suppresses a reduction in the efficiency of hydrogen compression action.

Second Embodiment

An electrochemical hydrogen pump 100 according to a second embodiment is the same as the electrochemical hydrogen pump 100 according to the first embodiment, except that the electrochemical hydrogen pump 100 according to the second embodiment further includes the heat insulating materials described below.

Figure 2:
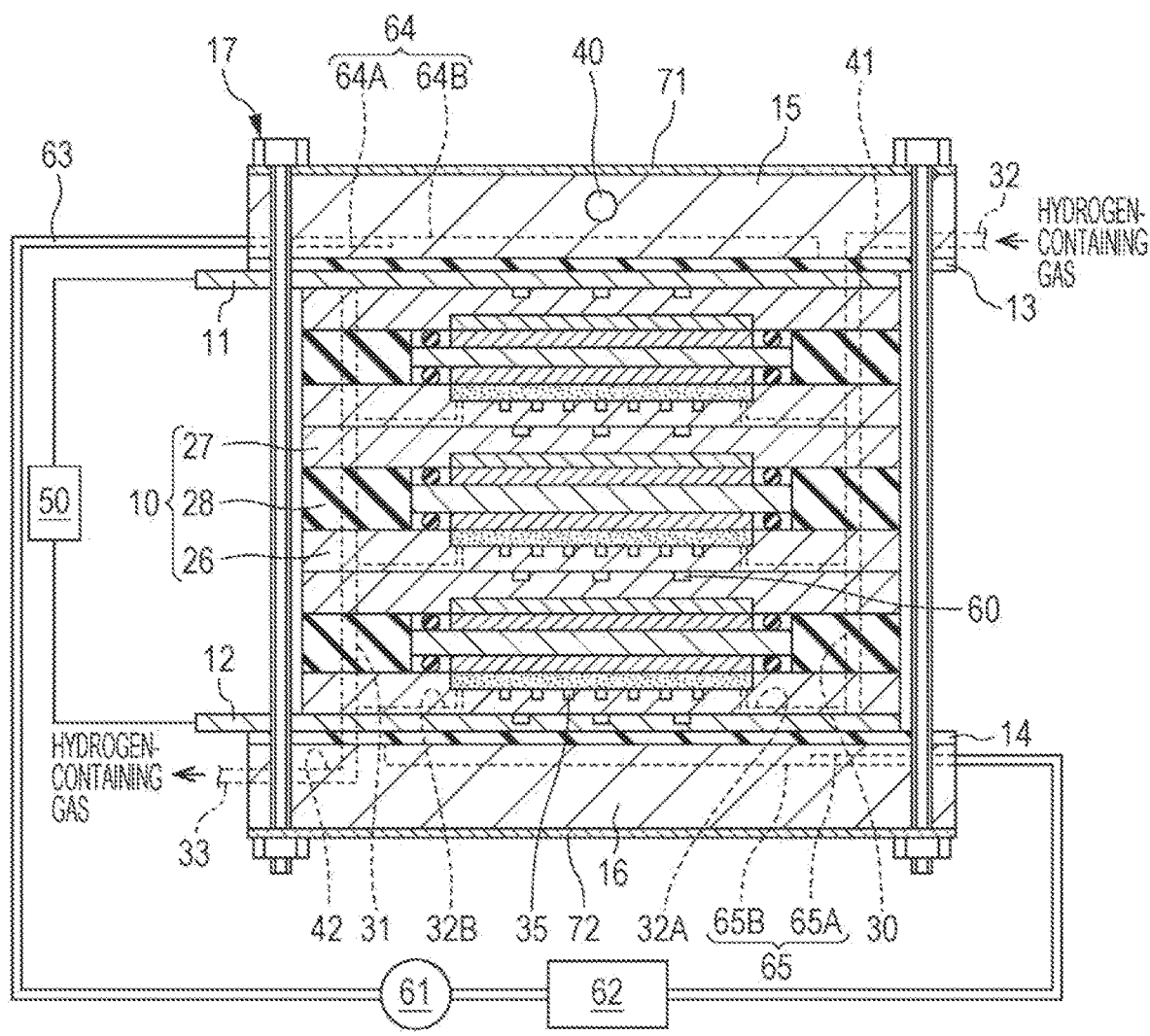
FIG. 2 is a diagram illustrating an example of an electrochemical hydrogen pump according to a second embodiment.

FIG. 2 is a diagram illustrating an example of the electrochemical hydrogen pump according to the second embodiment.

In the example illustrated in FIG. 2, the electrochemical hydrogen pump 100 includes a pair of heat insulating materials 71 and 72 disposed on the outside surfaces of the first end plates 15 and 16, respectively. Specifically, the heat insulating material 71 is disposed on the outside surface of the first end plate 15, and the heat insulating material 72 is disposed on the outside surface of the first end plate 16. Furthermore, the bolts serving as fasteners 17 are arranged to penetrate the heat insulating materials 71 and 72, in addition to the power feed plates 11 and 12, the insulating plates 13 and 14, and the first end plates 15 and 16.

Note that the above-described arrangement and structure of the heat insulating materials 71 and 72 are merely illustrative; the arrangement and structure of the heat insulating materials are not limited to this. For example, the heat insulating materials may be arranged to cover the entirety of the surfaces of the first end plates 15 and 16. For example, the heat insulating material may be arranged to cover the entirety of the multilayer structure constituting the electrochemical hydrogen pump 100 which includes the stack of the electrochemical cells 10.

Thus, the electrochemical hydrogen pump 100 according to this embodiment includes the heat insulating materials 71 and 72 disposed on the outside surfaces of the first end plates 15 and 16, respectively. This suppresses the dissipation of heat from the first end plates 15 and 16 to the outside air compared with the case where the heat insulating materials 71 and 72 are not disposed.

Consequently, in the electrochemical hydrogen pump 100 according to this embodiment, the likelihood of the flooding being caused in the anode gas feed channel 41 and the anode gas discharge channel 42 due to the condensation of water vapor contained in the hydrogen-containing gas may be further reduced as a result of the suppression of heat dissipation.

Furthermore, in the electrochemical hydrogen pump 100 according to this embodiment, the amount of heat that needs to be applied to the heating medium by the heater 62 for heating the first end plates 15 and 16 can be reduced as a result of the suppression of heat dissipation. Consequently, in the electrochemical hydrogen pump 100 according to this embodiment, for example, when the temperature of the stack needs to be increased upon the start of operation, the amount of time required for starting the operation of the electrochemical hydrogen pump 100 can be reduced in the case where the amount of heat applied to the heating medium by the heater 62 per unit time is constant.

The electrochemical hydrogen pump 100 according to this embodiment may be the same as the electrochemical hydrogen pump 100 according to the first embodiment, except the above-described features.

Third Embodiment

An electrochemical hydrogen pump 100 according to a third embodiment is the same as the electrochemical hydrogen pump 100 according to the second embodiment, except that the electrochemical hydrogen pump 100 according to the third embodiment further includes the second end plates described below.

FIG. 3 is a diagram illustrating an example of the electrochemical hydrogen pump according to the third embodiment.

In the example illustrated in FIG. 3, the electrochemical hydrogen pump 100 includes a pair of second end plates 81 and 82 disposed on the outside surfaces of the heat insulating materials 71 and 72, respectively. Specifically, the second end plate 81 is disposed on the outside surface of the heat insulating material 71, and the second end plate 82 is disposed on the outside surface of the heat insulating material 72. Furthermore, the bolts serving as fasteners 17 are arranged to penetrate the second end plates 81 and 82, in addition to the power feed plates 11 and 12, the insulating plates 13 and 14, the first end plates 15 and 16, and the heat insulating materials 71 and 72.

In the electrochemical hydrogen pump 100 according to this embodiment, since the second end plates 81 and 82 do not have the cathode gas discharge channel 40 through which the high-pressure hydrogen compressed in the cathode CA flows, the second end plates 81 and 82 may be composed of a material having lower hydrogen embrittlement resistance than a SUS316L steel. In addition, since the electrochemical hydrogen pump 100 produces high-pressure compressed hydrogen, the end plates are required to have high stiffness.

Accordingly, for example, the second end plates 81 and 82 may be composed of a chromium molybdenum steel, which is less expensive and has higher stiffness than a SUS316L steel.

Thus, the electrochemical hydrogen pump 100 according to this embodiment includes the second end plates 81 and 82 in addition to the first end plates 15 and 16. This enhances the stiffness of the entirety of the end plates.

Moreover, in the electrochemical hydrogen pump 100 according to this embodiment, the heat insulating material 71 is interposed between the first end plate 15 and the second end plate 81 and the heat insulating material 72 is interposed between the first end plate 16 and the second end plate 82. This reduces the heat capacity of the multilayer structure constituting the electrochemical hydrogen pump 100. In other words, in the electrochemical hydrogen pump 100 according to this embodiment, even in the case where the second end plates 81 and 82 are disposed on the first end plates 15 and 16, an increase in the amount of heat that needs to be applied to the heating medium by the heater 62 for heating the first end plates 15 and 16 can be suppressed due to the heat-insulation effect of the heat insulating materials 71 and 72.

In addition, in the electrochemical hydrogen pump 100 according to this embodiment, the heat insulating material 71 can be sandwiched between the first end plate 15 and the second end plate 81 and the heat insulating material 72 can be sandwiched between the first end plate 16 and the second end plate 82. This may reduce the detachment, peeling, and the like of the heat insulating materials 71 and 72.

Moreover, in the electrochemical hydrogen pump 100 according to this embodiment, for example, a chromium molybdenum steel, which has lower hydrogen embrittlement resistance but is less expensive and has higher stiffness than a SUS316L steel, is used as a material constituting the second end plates 81 and 82. This may enhance the stiffness of the second end plates 81 and 82 while suppressing an increase in the cost of the second end plates 81 and 82, compared with the case where a SUS316L steel is used. Note that the use of a chromium molybdenum steel is merely illustrative; another material may be used instead.

Furthermore, in the electrochemical hydrogen pump 100 according to this embodiment, the second end plates 81 and 82 do not have the anode gas feed channel 41, through which a highly humidified hydrogen-containing gas flows. Thus, it is not necessary to heat the second end plates 81 and 82 by the heat of the heating medium. This suppresses an increase in the amount of heat applied to the heating medium by the heater 62.

Although, as described above, the second end plates 81 and 82 do not have any of the anode gas feed channel 41 and the cathode gas discharge channel 40 in the electrochemical hydrogen pump 100 according to this embodiment, the structure of the second end plates 81 and 82 is not limited to this. For example, the second end plates 81 and 82 may have at least one of the anode gas feed channel 41 and the cathode gas discharge channel 40 formed therein.

The electrochemical hydrogen pump 100 according to this embodiment may be the same as the electrochemical hydrogen pump 100 according to first or second embodiment, except the above-described features.

The first, second, and third embodiments may be combined with one another as long as the combined embodiments do not contradict with each other.

From the foregoing description, various modifications and other embodiments of the present disclosure are obvious to one skilled in the art. Therefore, the foregoing description should be interpreted only as an example and is provided for the purpose of teaching the best mode for carrying out the present disclosure to one skilled in the art. The structural and/or functional details may be substantially altered without departing from the spirit of the present disclosure.

An aspect of the present disclosure may be applied to a compression apparatus that may suppress a reduction in the efficiency of hydrogen compression action, compared with the compression apparatuses known in the related art.

What is claimed is:

1. A compression apparatus comprising:
   a stack including a plurality of electrochemical cells stacked on top of one another, the electrochemical cells each including an anode, a cathode, and an electrolyte membrane interposed between the anode and the cathode;
   a pair of insulating plates disposed at respective ends of the stack in a direction in which the electrochemical cells are stacked;
   a pair of first end plates disposed on outside surfaces of the respective insulating plates; and
   a voltage applicator that applies a voltage between the anode and the cathode,
   wherein, upon the voltage applicator applying the voltage, the compression apparatus causes hydrogen included in a hydrogen-containing gas fed to the anode to move to the cathode and produces compressed hydrogen,
   wherein one of the first end plates has a first channel through which the hydrogen-containing gas fed to the anode flows and a second channel through which a heating medium flows, the first and second channels being formed in one of the first end plates, and
   wherein the compression apparatus further comprises a heater that heats the heating medium.

2. The compression apparatus according to claim 1, wherein the other of the first end plates has a third channel through which the hydrogen-containing gas discharged from the anode flows and the second channel, the third and second channels being formed in the other of the first end plates.

3. The compression apparatus according to claim 1, further comprising:
   a pair of heat insulating materials disposed on outside surfaces of the respective first end plates.

4. The compression apparatus according to claim 3, further comprising:
   a pair of second end plates disposed on outside surfaces of the respective heat insulating materials.

* * * * *